United States Patent
Bushberger

(10) Patent No.: US 6,546,679 B1
(45) Date of Patent: Apr. 15, 2003

(54) SELF-ADHESIVE PROTECTANT FOR INSULATED BUILDING FOUNDATION

(76) Inventor: Todd E. Bushberger, 3154 S. Toldt Pkwy., West Allis, WI (US) 53227

(*) Notice: Subject to any disclaimer, the term of this patent is extended or adjusted under 35 U.S.C. 154(b) by 0 days.

(21) Appl. No.: 10/066,842

(22) Filed: Feb. 4, 2002

(51) Int. Cl.[7] .......................... E02D 19/00; B32B 7/12; B32B 5/02; B32B 11/02; B32B 27/04
(52) U.S. Cl. .................... 52/169.14; 52/292; 52/293.3; 428/343; 442/43; 442/48; 442/86; 442/131
(58) Field of Search .................... 52/177, 179, 180, 52/292, 293.3, 169.14; 428/343, 304.4; 442/42, 43, 48, 86, 131

(56) References Cited

U.S. PATENT DOCUMENTS

| | | | |
|---|---|---|---|
| 2,352,338 A | * | 6/1944 | Muirhead |
| 4,142,344 A | | 3/1979 | Palmaer |
| 4,309,855 A | | 1/1982 | Pate et al. |
| 4,335,548 A | | 6/1982 | Rehbein |
| 4,409,766 A | | 10/1983 | Blackmore |
| 4,532,745 A | * | 8/1985 | Kniard |
| 4,653,241 A | | 3/1987 | Bindi |
| 4,691,478 A | | 9/1987 | Lorg |
| 4,704,048 A | | 11/1987 | Ahlgrimm |
| 4,854,097 A | * | 8/1989 | Haener |
| 5,248,225 A | | 9/1993 | Rose |
| 5,749,182 A | * | 5/1998 | Vavrinak |
| 5,803,669 A | * | 9/1998 | Bullard |
| 5,985,071 A | * | 11/1999 | Wynne |
| 6,238,766 B1 | * | 5/2001 | Massett |
| 6,287,638 B1 | * | 9/2001 | Castelli |
| 6,349,520 B2 | * | 2/2002 | Kubica |
| 6,235,136 B1 | * | 5/2002 | Kittson |

* cited by examiner

Primary Examiner—Carl D. Friedman
Assistant Examiner—Kevin McDermott
(74) Attorney, Agent, or Firm—Andrus, Sceales, Starke & Sawall, LLP

(57) ABSTRACT

An insulated building foundation protective arrangement includes a multi-layer, reinforced, waterproof, rubberized asphalt, U.V. resistant laminate having a self-adhesive backing attachable to an insulated building foundation without any other mechanical fasteners.

8 Claims, 4 Drawing Sheets

SELF-ADHESIVE PROTECTANT FOR INSULATED BUILDING FOUNDATION

FIELD OF THE INVENTION

This invention relates broadly to a protective arrangement for insulated building foundations and, more particularly, pertains to improvements in the construction and attachment of such protective arrangement.

BACKGROUND OF THE INVENTION

Building foundations formed of cement block or poured concrete are typically waterproofed and insulated such as with foam on their exterior surfaces below and above the final grade. A successful insulator for building foundations must be a shielded installation which is capable of withstanding a range of various destructive forces over a long period of time. Such destructive forces include solar degradation caused by direct exposure to the sun, chemical agents above and below the ground and mechanical forces such as caused by a weed wacker or other lawn maintenance equipment used on the grass covering the grade.

The prior art is replete with numerous designs for protective coverings comprised of plastic, aluminum, metal, cement, stucco, fiber glass and the like which are joined to the building insulation. However, present practice involves adhesively coating the protective covering to the exterior surface of the insulation on site and then further securing the protective covering with some type of mechanical fastener. Such practice is extremely labor-intensive and can be difficult to carry out given the temperature and environmental conditions at the time of installation. Existing protective coverings have also been lacking in withstanding the myriad of destructive forces subjected upon them over long periods of time.

Accordingly, there remains a need to provide a differently styled protective arrangement for building insulation having an enhanced construction which may be easily and reliably applied to a variety of insulating and building materials without mechanical fasteners. Such arrangement should be fabricated to safeguard the insulation from ultraviolet (U.V.) rays of the sun, protect against shrinking, cracking and denting, and to resist moisture as well as any other agents in the ground. In addition, such protective arrangement should be flexible and long lasting, have a high degree of elasticity and be able to tolerate a wide range of temperatures.

SUMMARY OF THE INVENTION

It is a general object of the present invention to provide a protective arrangement for an insulated building foundation which will withstand the destructive forces to which it will be exposed for long periods of time without degradation.

It is one object of the present invention to provide a waterproof, rubberized asphalt polymer, U.V. protectant for building insulation foam exposed to the sun.

It is also an object of the present invention to provide a conveniently installed, layered, foam protectant comprised of a ter polymer acrylic resin, a meshed reinforcement and a self-adhesive asphalt membrane with a release film attached thereto.

It is a further object of the present invention to provide an insulation protectant for new and existing building constructions.

It is an additional object of the present invention to provide a foam protectant which is low cost to manufacture and economical, convenient and versatile in its many uses.

In one aspect of the invention, an insulated building foundation protective arrangement includes a multi-layer reinforced waterproof, rubberized asphalt, U.V. resistant laminate having a self-adhesive backing attachable to an insulated building foundation without any other mechanical fasteners. The laminate is constructed and arranged in the form of a flexible roll. The insulated building foundation includes a layer of foam attachable to a concrete foundation. The laminate includes a face portion covering an outer and upper surface of the foam, and a flap portion attachable to a top edge of the concrete foundation. The foam is formed at an upper end with a downwardly and outwardly angled surface and a top flat edge for leading water away from the building foundation. In one alternative embodiment, the insulated building foundation includes foam block structure filled internally with poured concrete.

In another aspect of the invention, an insulated building foundation protective arrangement includes a first layer having an elastomeric, waterproof, ultraviolet resistant coating. A second layer has a reinforced mesh material joined to the first layer. A third layer has a rubberized asphalt membrane carrying a self-adhesive coating thereon, a third layer being attached to the second layer. A fourth layer has a release film removably attached to the third layer. The interconnected first, second, third and fourth layers are connected to an insulated building foundation by removal of the release film and adherence via the self-adhesive coating. The building foundation includes a layer of expanded/extruded polystyrene. The first layer is preferably formed of a ter polymer acrylic resin having a textured surface. The second layer includes a mesh fabricated from fiberglass, cloth or vinyl.

Various other objects, features and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
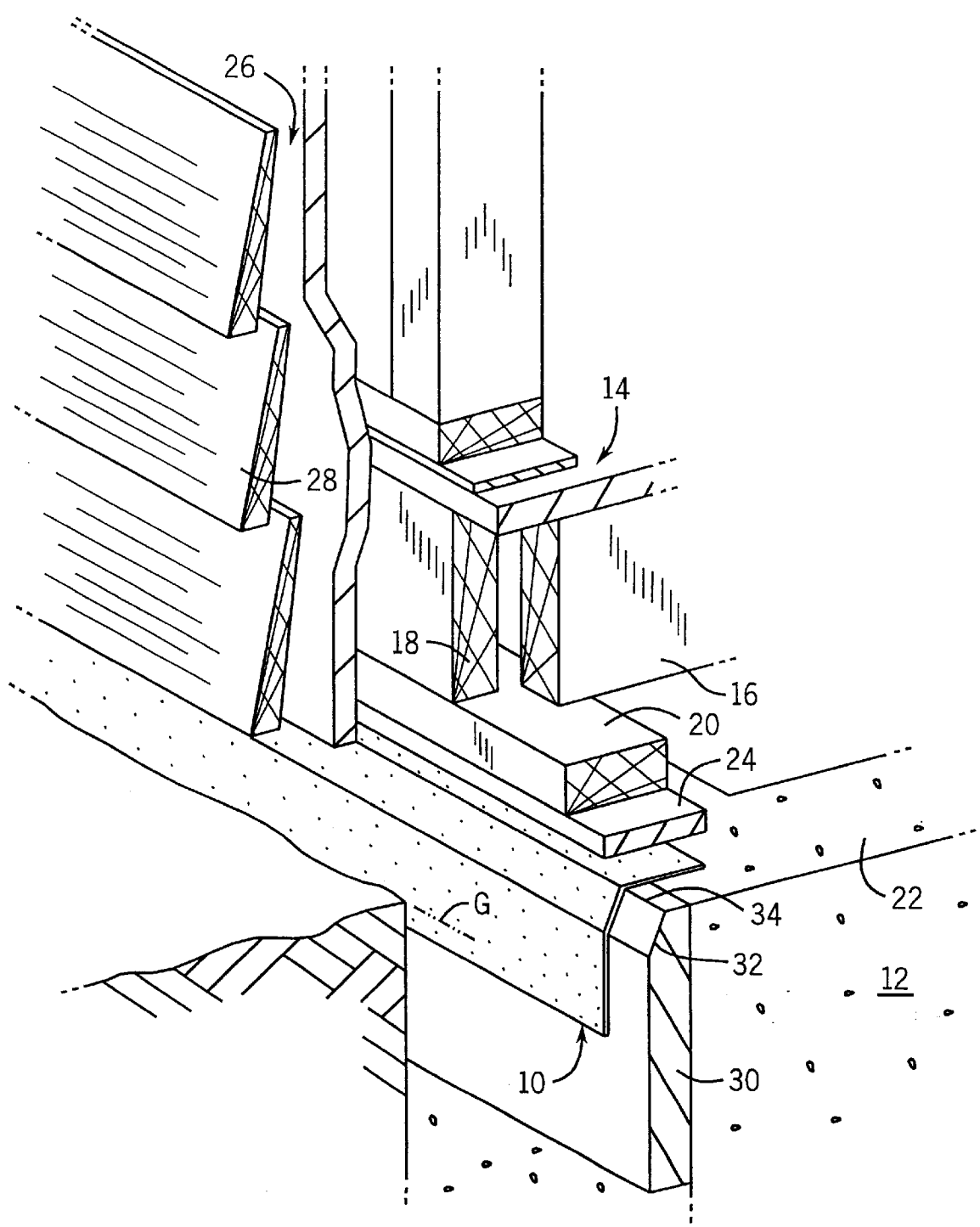
FIG. 1 is a perspective view of an insulated building foundation provided with a waterproof, rubberized, U.V. protectant embodying the invention.

Referring now to the drawings, FIG. 1 illustrates a protective arrangement 10 for shielding an insulated building foundation 12 commonly made of either concrete blocks or poured concrete. A wooden floor deck 14 of a home lies upon a wooden joist 16 and a cantilever floor platform 18, and has a sill plate 20 which is supported on the top edge 22 of the concrete foundation 12. After a home is built, the concrete foundation 12 may shrink or settle, and the wooden floor deck 14 may warp. This movement and distortion can create gaps between the sill plate 20 and the top edge 22 through which air and moisture can pass. To close these gaps, a foundation seal (such as disclosed in the present inventor's pending U.S. application Ser. No. 10/016,320 filed Dec. 10, 2001) is employed. In FIG. 1, this seal is illustrated as a wall liner 24 as more fully discussed in the aforementioned pending application. The building foundation 12 also includes a rigid insulating sheathing 26 outside the floor deck 14 and exterior siding 28 lying external to the sheathing 26.

To prevent heat loss, it is common practice to place at least one layer of insulating material 30 against the outer edge of the concrete foundation 12 which extends from beneath the siding 28 downwardly beneath the slope of the adjacent ground or grade G. In most cases, earth is backfilled against the insulating material 30 so as to secure the material in place against the concrete foundation 12. Typically, this insulating material 30 takes the form of an expanded/extruded polystyrene (foam) wall which does not expand or contract appreciably and is durable and reliable to offer basic protection against the external environment.

It is a feature of the present invention to provide the foam wall 30 with an upper end which is angled 45 degrees downwardly and outwardly at 32 and capped with a flat top edge 34. Such structure is conducive to leading any moisture or water away from the building foundation 12.

In the present invention, the protective arrangement 10 is a multi-layer, reinforced waterproof, rubberized asphalt, U.V. resistant laminate used to protect the insulating material 30 from solar rays and from other destructive forces such as from mechanical damage. Laminate 10 is provided with a self-adhesive backing which permits easy and reliable attachment to the insulating material 30 without the need for any other mechanical fasteners.

Figure 2:
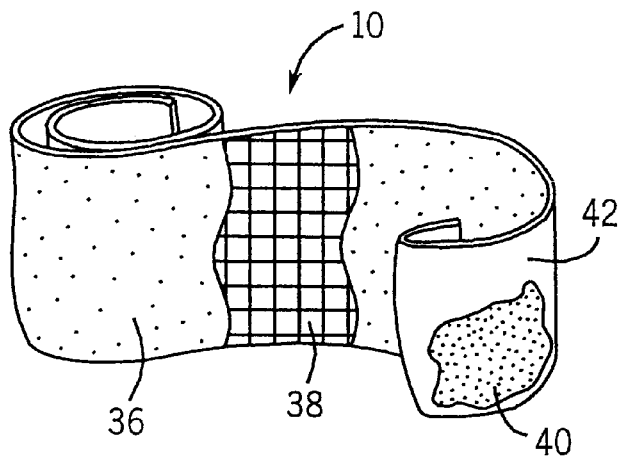
FIG. 2 is a perspective view of the protectant used in FIG. 1 with parts broken away to reveal the layered construction thereof.

As shown in FIG. 2, the laminate embodying protective arrangement 10 typically takes the form of a flexible roll material having four layers that are connected together. A first or outer layer 36 has an elastomeric, waterproof, ultraviolet resistant coating formed, for example, by a ter polymer acrylic resin, such as manufactured by Rohm and Haas Company of Cornelius, N.C. The coating is desirable because it has a high degree of elasticity, is useful over a wide range of temperatures and presents a textured surface which mimics or blends with the surface of the concrete foundation 12. More particularly, the ter polymer material 36 elongates 610% at 77° F. and 116% at 0° F. A second layer 38 of fiberglass, vinyl or cloth (polyester) mesh is coated or otherwise applied with the first layer 36 and provides marked durability and strength to resist any mechanical damage, as may be caused by lawn maintenance equipment such as a weed wacker, when the laminate 10 is installed upon the insulating material 30. A typical supplier of mesh 38 is Tietex International of Spartanburg, S.C. A third layer 40 is defined by a rubberized asphalt membrane carrying a self-adhesive coating thereon with the membrane being attached to the second layer 38. The self adhesive coating will adhere reliably to foam, wood, metal, vinyl, plastic, concrete or cinder block. A fourth layer 42 is formed by a release film removably attached to the third layer 42 to prevent the self-adhesive coating from prematurely adhering to any element before the laminate 10 is installed.

When installing the protective arrangement 10 in new building construction, such as illustrated in FIG. 1, the foam walls 30 are supplied in various lengths which typically have a height of about 12 inches and a thickness of about 1½ inches. In some geographical areas which have insect or termite problems, it is optional to treat the foam walls 30 with an insectiside or termiticide. The laminate 10 has a face portion 44 which runs upwardly along at least the upper, outer face of the insulating material 30 including the angled portion 32 and the top edge 34. Integrally attached to the face portion 44 is a flap portion 46 which extends away from the insulating material 30 for attachment to top edge 22 of concrete foundation 12. As will be understood below, the face portion 44 and the flap portion 46 normally carry separate sections of release film 42 to protect the self-adhesive coating.

Figure 3:
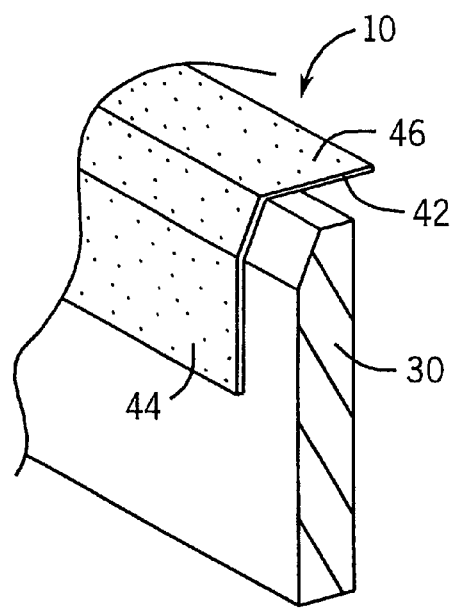
FIG. 3 is a partial perspective view of the protectant installed on a piece of foam insulation and showing a flap portion to be connected to the top of the foundation.

The laminate 10 is quickly attached to the outer face of the insulating material 30 as shown in FIG. 3 by removing the release strip 42 from the face portion 44 and pressing the face portion 44 against the upper end of the foam wall 30. Next, the foam wall 30 with the laminate 10 attached is applied with a suitable bonding material along its inner face and secured to the outer surface of the concrete foundation 12 with the flap portion 46 extending over the top edge 22 of the concrete foundation 12. The release film 42 is then removed from the flap portion 46 which is secured along the top edge 22 of the concrete foundation 12 after which the remainder of the building foundation including the deck 14 is added. Alternatively, the foam wall 30 can be attached to the concrete foundation 12 and the laminate 10 applied thereafter as described above.

In the preferred embodiment, the face portion 44 covers several inches of the insulating material 30 above grade G, but it should be understood that the face portion 44 may be entirely coextensive with the outer face of the insulating material 30 so that the face portion 44 also extends below grade G.

With the protective arrangement 10 in place, the insulating material 30 above grade G is protected from solar rays and mechanical damage. Any moisture or water will run along the laminate 10 at the angled portion 32 so that the moisture will not accumulate along its upper end. The laminate 10 will not crack, dent or shrink. The self-adhesive coating 40 provides a reliable and convenient method of attaching the laminate 10 without the need for any other mechanical fasteners as required in the prior art. It has been found that the laminate 10 may be easily cut into a Vee with a worker's utility knife so as to adapt the laminate 10 around corners of the foundation.

Figure 4A:
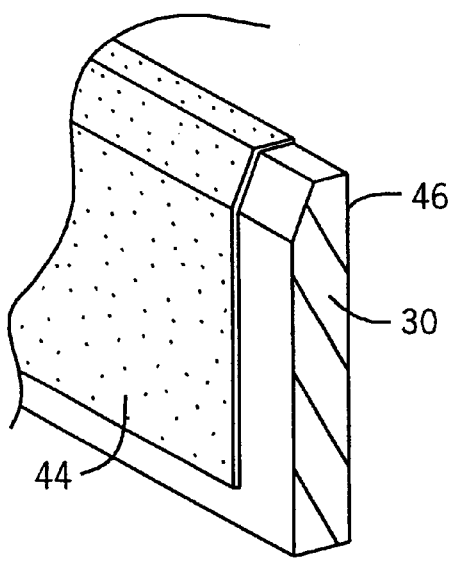
FIGS. 4 and 4A are perspective views of a protectant and foam combination as used in a retrofit.
Figure 4:
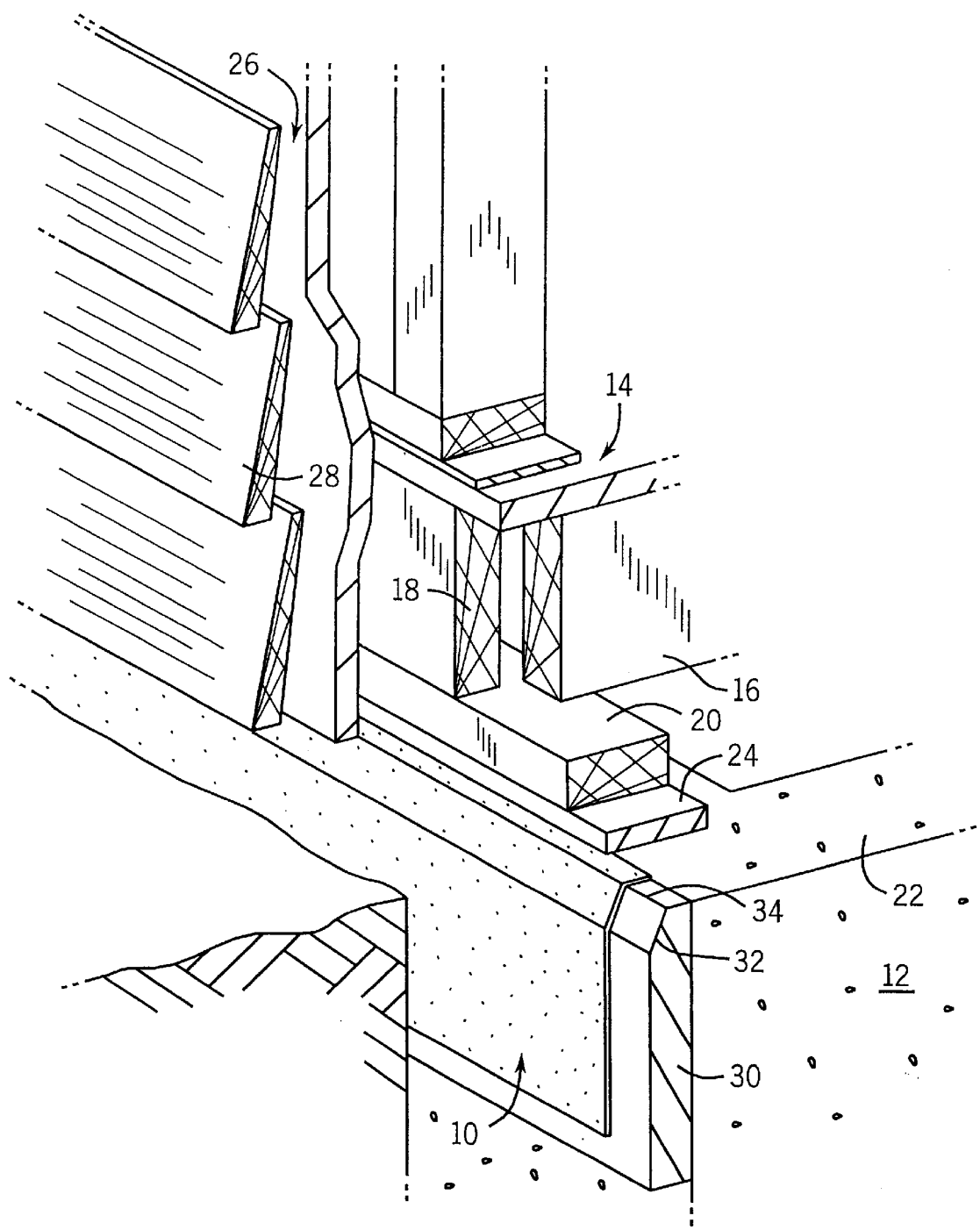

FIGS. 4 and 4A show a retrofit situation for an existing building foundation. In this version, the flap portion 46 is simply folded and adhered against the inner face of the foam wall 30. The foam wall 30 with the laminate 10 is then attached to the outer surface of the concrete foundation 12 with the top edge positioned directly underneath the sheathing 26.

Figure 5:
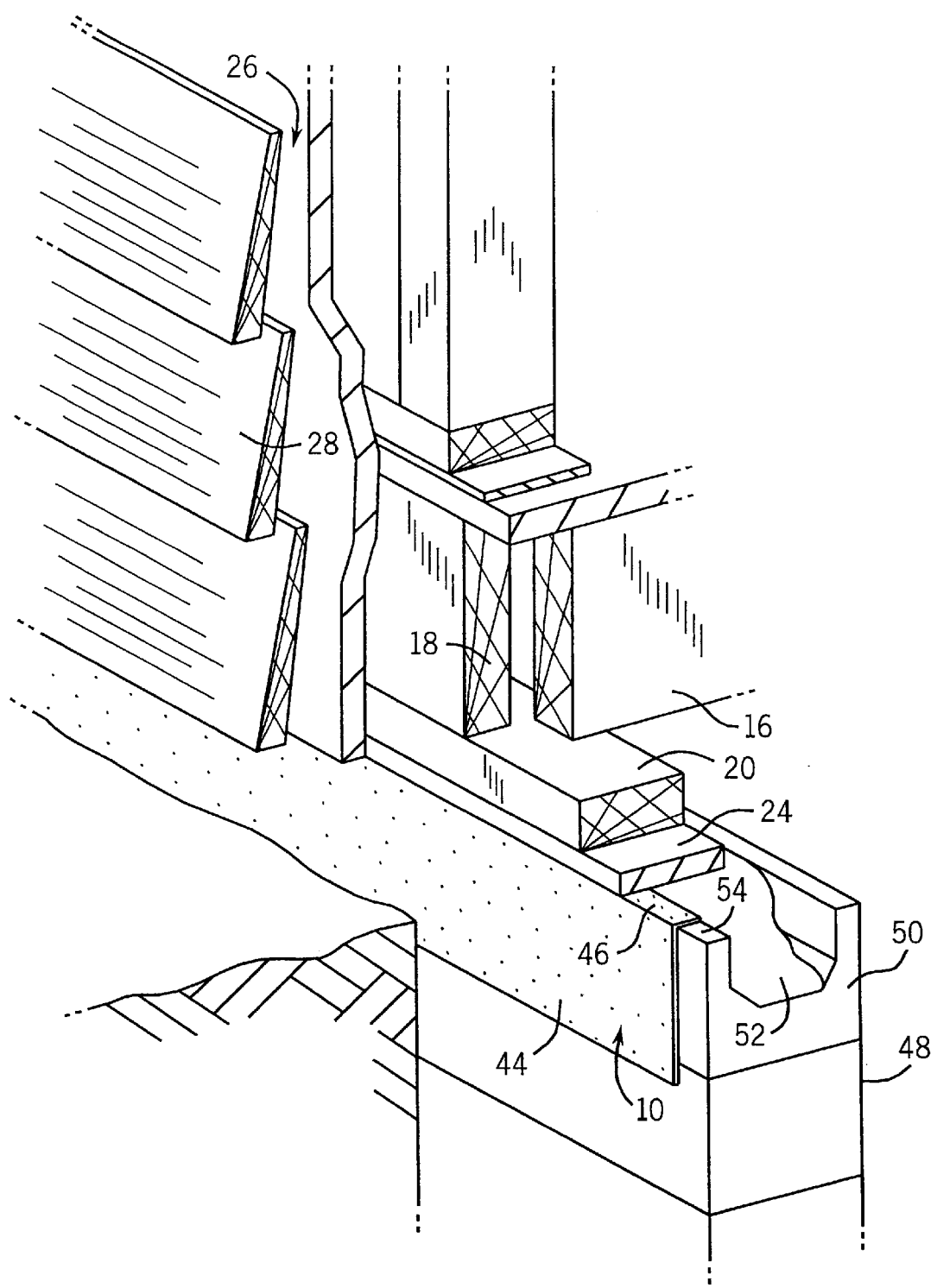
FIG. 5 is a perspective view of a protectant as used on a concrete filled foam element.

FIG. 5 illustrates a building foundation having a series of stacked foam blocks 48, the upper block 50 being filled with poured concrete 52. In this design, the face portion 44 of the laminate 10 extends downwardly along the planar outer surface of foam block 50 and the flap portion 46 is secured along the top edge 54 of the foam block 50.

It should now be appreciated that the present invention provides a unique waterproof U.V. resistant protective arrangement 10 for safeguarding an insulating material 30 such as used in new and existing building construction. The protective arrangement 10 is extremely labor friendly because it is easily installed without the need for special tools or mechanical fasteners. The protective arrangement 10 is efficiently manufactured at a low cost and supplied in an easily handled roll form.

While the invention has been described with reference to a preferred embodiment, those skilled in the art will appreciate that certain substitutions, alternations and omissions may be made without departing from the spirit thereof. Accordingly, the foregoing description is meant to be exemplary only, and should not be deemed limitative on the scope of the invention set forth with the following claims.

I claim:

1. An insulated building foundation protective arrangement comprising:

a multi-layer, reinforced, waterproof, rubberized asphalt, U.V. resistant laminate having a self-adhesive backing permanently attachable to a foam insulated building foundation without any other mechanical fasteners, the laminate being constructed with anti-cracking and anti-shrinking characteristics.

2. The protective arrangement of claim 1, wherein the laminate is constructed and arranged in the form of a flexible roll.

3. The protective arrangement of claim 1, wherein the laminate includes a face portion covering an outer and upper surface of the foam, and a foldable flap portion attachable to a top edge of the concrete foundation.

4. The protective arrangement of claim 1, wherein the foam is formed in an upper end with a downwardly and outwardly angled surface and a top, flat edge for leading water away from the building foundation.

5. The protective arrangement of claim 1, wherein the insulated building foundation includes foam block structure filled internally with poured concrete.

6. An anti-cracking, anti-shrinking, foam insulated building foundation protective arrangement comprising:

a first layer having an elastomeric, waterproof, ultraviolet resistant coating;

a second layer having a reinforced mesh material joined to the first layer;

a third layer having a rubberized asphalt membrane carrying a self-adhesive coating thereon, the third layer being attached to the second layer; and a fourth layer having a release film removably attached to the third layer, the interconnected first, second, third, fourth layers being permanently connected to the foam insulated building foundation by removal of the release film and adherence via the self-adhesive coating.

7. The protective arrangement of claim 6, wherein the first layer is formed of a ter polymer acrylic resin having a textured surface.

8. The protective arrangement of claim 6, wherein the second layer includes a mesh fabricated from cloth, vinyl or fiberglass.

* * * * *